Nov. 18, 1930.              G. LANG                  1,781,851
                          BEAN CUTTER
                      Filed Jan. 21, 1928        2 Sheets-Sheet 1

INVENTOR
G. Lang
BY
ATTORNEY

Nov. 18, 1930.  G. LANG  1,781,851
BEAN CUTTER
Filed Jan. 21, 1928   2 Sheets-Sheet 2

INVENTOR
G. Lang
BY
ATTORNEY

Patented Nov. 18, 1930

1,781,851

UNITED STATES PATENT OFFICE

GREGORY LANG, OF YUBA CITY, CALIFORNIA

BEAN CUTTER

Application filed January 21, 1928. Serial No. 248,360.

This invention relates to machines for cutting bean vines and the like, to enable them after being cut to be placed in windrows on the ground for threshing purposes.

The machine is of an extremely simple and inexpensive nature and is of that type which is arranged to engage and cut through the roots of two rows of vines at a time. The principal objects of my invention are to provide such machine with means for causing the cutting blades to be held in proper position relative to the ground during the cutting operations; for raising the blades and side runners to which they are connected a considerable distance from the ground for transportation; for rendering the blades readily accessible without removing the same so that they may be easily sharpened when necessary; for causing the machine to steer easily along the field; for enabling the space between the supporting wheels and blades to be independently adjusted to suit the different spacing between rows of vines; and to arrange the machine as a whole so that there is nothing to catch or hold the vines after they are cut and cause them to be dragged along with the machine.

The machine of the present invention also has various features in common with the machine shown in my subsequently filed copending application, Serial No. 427,499 filed February 11, 1930.

These objects I accomplish by means of such structure and relative arrangement of parts as will fully appear by a perusal of the following specification and claims.

In the drawings similar characters of reference indicate corresponding parts in the several views:

Fig. 3 is a fragmentary end elevation showing the adjustable runner support construction.

Fig. 4 is a fragmentary cross section taken on the line 4—4 of Fig. 1.

Fig. 5 is a perspective view of a guard member, detached.

Figure 1:
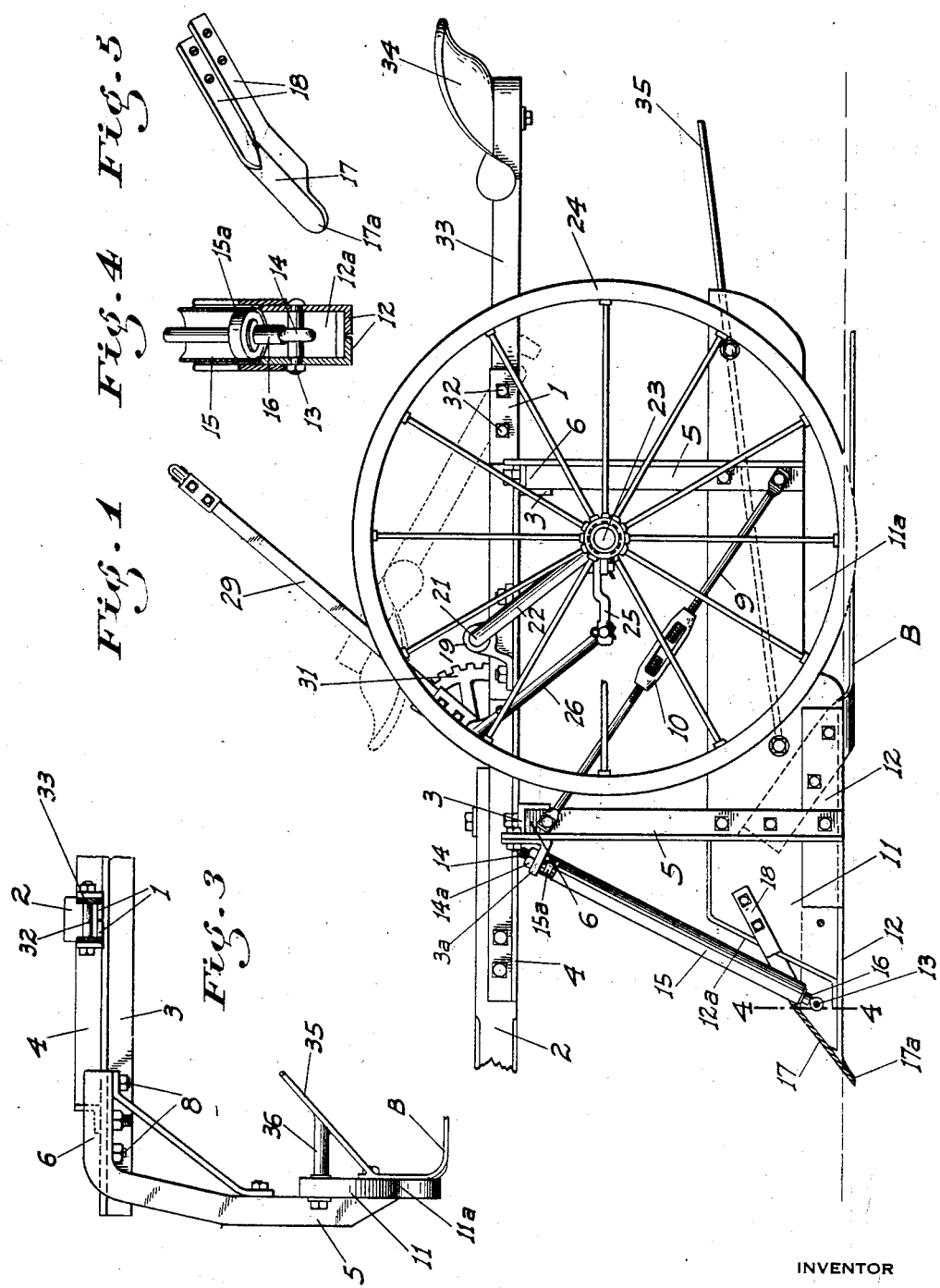
Fig. 1 is a side elevation of my improved bean cutter.

Referring now more particularly to the characters of reference on the drawings, the numeral 1 denotes a pair of longitudinal and closely spaced members, preferably angle irons set with their horizontal sides on the bottom and facing each other to form a channel. A wooden beam 2 to serve as a tongue for attachment to draft animals is seated in the channel and is secured to the angles; the beam projecting ahead of the angles some distance but terminating short of their rear ends. The beam is rigidly bolted on to a pair of longitudinally spaced and transversely extending frame beams 3 which are also preferably of angle form.

Horizontal side bars 4 are superimposed on and rigidly secured to the beams 3 toward the outer ends of the latter, said bars 4 converging at their forward ends to rigid connections with members 1 at their forward ends. The above described parts form a rigid frame unit.

Depending from the beams 3 adjacent their ends are vertical arms 5 whose upper ends are bent to form horizontal extensions 6 which slidably engage the under faces of the beams 3. Said beams are provided with a series of longitudinally spaced holes 7 through which detachable bolts 8 pass, to connect the members 6 and 3 together for adjustment transversely of the machine. The arms 5 on each side are braced by a diagonally extending rod element 9 having a turnbuckle 10 interposed therein.

Figure 2:
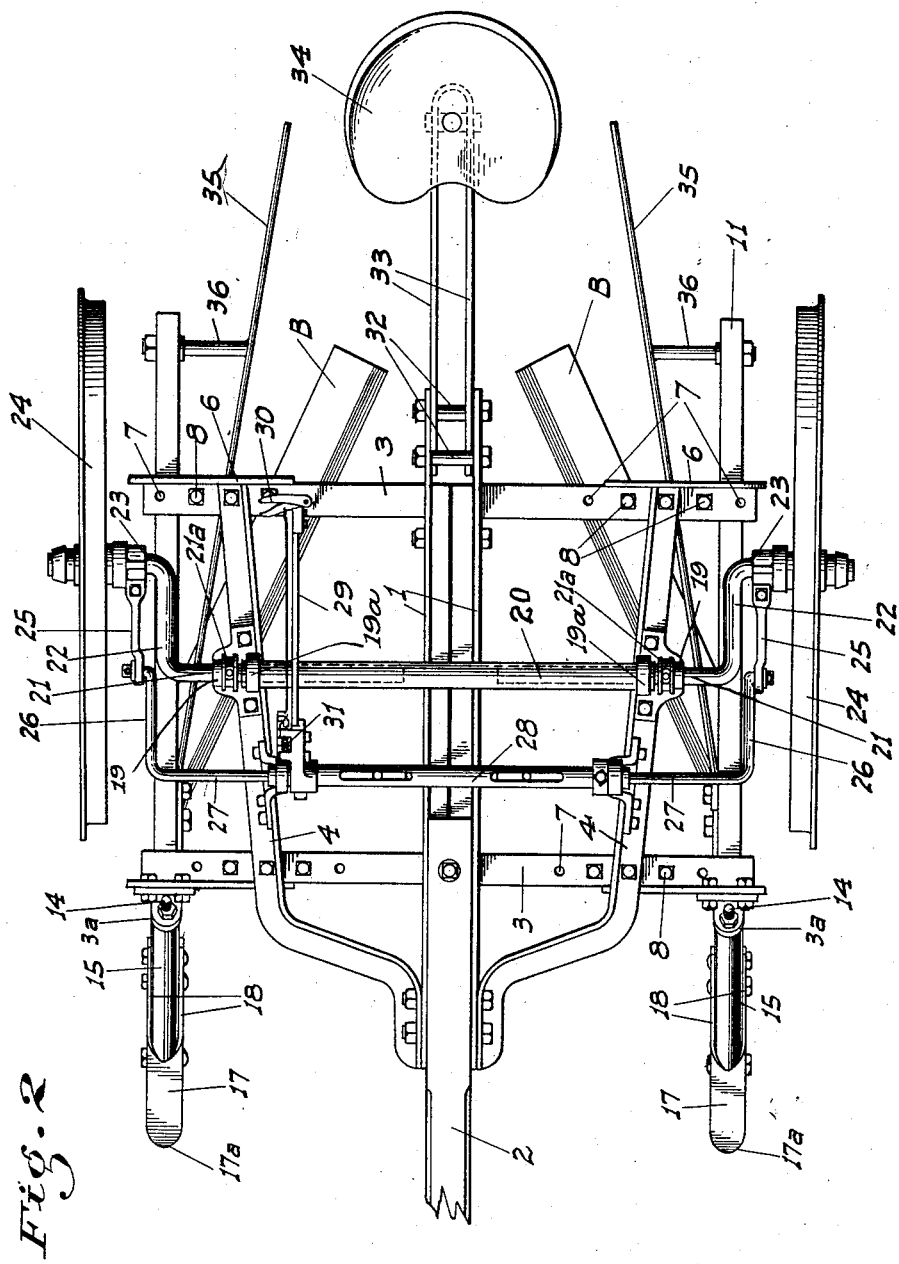
Fig. 2 is a top plan view of the same.

Bolted to the lower ends of the arms are vertically disposed wooden runners 11, which are parallel to each other. The forward portions of these runners ride adjacent the ground when the machine is in operation, but their rear portions are cut away from the bottom up as shown at 11ª. Horizontal blades B, sharpened along their forward edges are secured to the runners ahead of the cut-away portion and extend thence rearwardly in converging relation to adjacent the plane of the rear ends of the runners as shown in Fig. 2. These blades lie in about the same horizontal plane as the bottom of the runners at their forward ends.

The ground engaging portion of each runner is sheathed with opposed angle-plates 12, arranged as shown in Fig. 4, and which extend ahead of the runner some distance. A brace strap 12ª is rigidly fastened to the side plates 12 just ahead of the runner, said strap extending up the forward edge of the runner and then back along the top of the same some distance, as shown in Fig. 1. A cross pin 13 is placed through the sides of the irons 12 ahead of the runner, and serves as a hanger for the lower end of a long bolt 14, whose upper end projects through a bracket 3ª mounted on the adjacent frame beam 3 and has a nut 14ª thereon above the bracket. This bolt is set at a suitable rearward slant. A tubular roller 15 is placed about the bolt, being turnably mounted in concentric relation thereto by means of end bearing-discs 15ª. The lower disc is held in spaced relation to the cross pin 13 by a sleeve 16. The forward edge of the runner is parallel to the roller, and a sufficient distance behind the same to prevent any vines being wedged therebetween. The suspension of the roller from the cross pin 13 also provides a space which prevents anything from wedging under the roller and preventing the free turning of the same. To provide additional protection for the lower end of the roller, a guard plate 17, having a greater slant than the roller, extends ahead of the same and across the space between the members 12, being rigidly welded or otherwise secured thereto. At its rear ends, the plate is provided with rearwardly extending straps 18, which are secured to the sides of the runner 11 above the irons 12.

The rollers are for the purpose of dividing or separating the usually tangled mass of vines; the freely turnable mounting of these rollers enabling this separation to be attained without actually pulling up the vines and also without undue resistance to the forward movement of the machine. Being set at a rearward slope toward their upper ends, said rollers also function easier than if they were straight, since they engage the vines with a shearing and upwardly lifting action and thus spread the vines out so that they are relatively thin; instead of engaging them with a direct forward push which would more likely tend to cause the vines to be even more firmly compressed and matted together than originally.

The lower end of the plate is formed with a tip 17ª which digs into the ground when the machine is in operation, so as to offset the tendency of the runner to lift from the ground, and cause the blades to remain in proper engagement with the vines.

The tip being rigidly secured to the angle irons, and the latter being rigidly braced from the frame beam 3 by the tension rod or bolt 14, the downward pressure on the ground engaging tip 17ª will not impart any direct pressure to the runner tending to cause the same to split as is usually the case.

Transversely spaced bearing units are fixed on the frames 4. Each bearing unit comprises a pair of transversely separated members 19 and 19ª; a transverse sleeve 20 being fixed to and extending between the inner members 19ª of these bearings. Independent shafts 21 are slidably mounted in the sleeve and project beyond the outer ends of the same and also beyond the outer bearing members 19. Each bearing unit comprising a pair of transversely separated members as above stated, the adjacent portion of the corresponding shaft 21 is exposed therebetween. A collar 21ª is adjustably fixed on each shaft between the bearing members so that said shafts are normally prevented from sliding movement.

The outer ends of the shafts are bent down to form arms 22 from the lower ends of which spindles 23 project outwardly. Ground engaging wheels 24 are turnable on these spindles, the diameter of these wheels being such that when the forward ends of the runners ride on the ground, the arms 22 have a considerable downward slant to the rear as shown in Fig. 1. The wheels have a slight toe-in toward the front to facilitate steering and to insure a straight movement of the machine along the ground.

The arms 22 are moved forwardly and to a vertical position so as to cause the runners and frame to be raised a certain distance, by means of horizontal links 25 which are connected at one end to the wheel spindles and at the other end to the lower ends of arms 26 which are substantially parallel to the arms 22. The upper ends of the arms 26 are connected to rods 27 which are slidable but non-turnable in a sleeve 28 journaled on the frame members 4. This sleeve is connected to a rearwardly projecting lever 29, which has a laterally projecting handle 30 and a pawl and rachet mechanism 31 of common character associated therewith and controllable from the handle to enable the lever to be set and held in any desired position.

A pair of transverse longitudinally spaced bolts 32 are mounted in the members 1 rearwardly of the tongue. The rearmost bolt forms the pivot for a pair of rearwardly extending bars 33 which at their rear ends support the operator's seat 34. The foremost bolt prevents the downward movement of the seat bars below a horizontal plane while offering no interference to the upward and forward swinging of the seat as shown in dotted lines in Fig. 1. The laterally projecting handle on the lever enables the same to be conveniently operated from the seat and the swinging forward of the latter renders the blades more accessible from the rear than would otherwise be the case.

The runners 11 have the usual deflecting rods 35 projecting upwardly and inwardly from their inner faces, these rods being braced from the runners adjacent the rear ends of the latter by transverse bolts 36 which also serve as foot supports for the occupant of the seat.

The lateral adjustment of the frame 1 which may be accompanied by but which is independent of the corresponding movement of the wheels enables the spacing of the wheels and runners to be adjusted according to the spacing of the rows of vines either singly or together as may be desired.

The height of the tongue from the ground provides for a substantially straight pull from the draft animals connected to the tongue while the distance the runners may be raised from the ground by the adjustment of the wheels insures that the structure will properly clear the ground when not in operation.

It will be noted that there are no laterally extending members of any kind below the frame structure, and said structure being a considerable height from the ground, there is nothing in the area included between the frames, the side runners and the ground to interfere with the free passage of the vines therebetween. There is, therefore, no danger of any vines being caught by any part of the machine and dragged along.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a bean cutter, a frame, side runners below and supported from the frame, side plates connected to and extending ahead of each runner, a cross pin between said plates, a bolt attached to and projecting upwardly from the pin, connecting means between the frame and the upper end of the bolt to enable the same to be maintained under tension, and an element to engage the ground secured to and depending from the forward end of the plates.

2. In a bean cutter, a frame, side runners below and supported from the frame, side plates connected to and extending ahead of each runner, a cross pin between said plates, a bolt attached to and projecting upwardly from the pin, connecting means between the frame and the upper end of the bolt to hold the same stationary, a roller turnable on the bolt, and means holding the lower end of the roller spaced from the cross pin.

3. A structure as in claim 2, with a guard plate extending between the side plates in front of the roller and projecting from the roller to the ground with a forward and downward slant.

4. In a bean cutter, a horizontal frame, side runners below the same, vertical members between and connecting the runners and frame, tips at the forward end of the runners to dig into the ground, side plates connecting the tips to the runners, and tension members between said plates adjacent the tips and the frame.

5. In a bean cutter, a horizontal frame structure, tranverse shafts slidably supported from the frame, arms depending from the outer ends of the shafts, wheels supported by the arms, a transverse sleeve turnable on the frame, rods slidably but non-turnably mounted in the sleeve, means for rotating the sleeve, and connections between the rods and arms for causing the latter to be swung about the shafts as an axis with the rotation of the sleeve.

6. In a bean cutter, a frame, side runners below and supported from the frame, ground engaging tips on the forward ends of the runners, tension rods secured to and depending from the frame, means securing the lower ends of the rods in rigid connection with the tips, and rollers disposed about the rods.

In testimony whereof I affix my signature.

GREGORY LANG.